Figure 1:
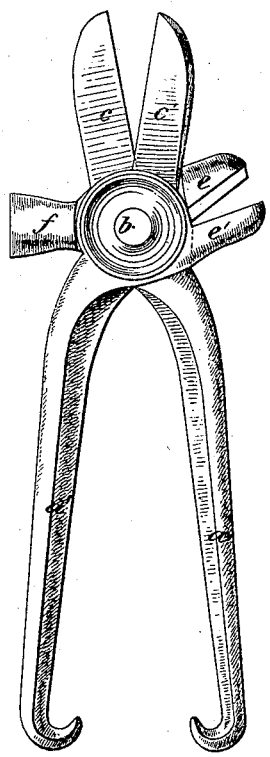

H. R. IVES.

Combination Household Tools.

No. 134,064.            Patented Dec. 17, 1872.

Witnesses            Inventor

AM PHOTO-LITHOGRAPHIC CO. N.Y.(OSBORNE'S PROCESS.)

UNITED STATES PATENT OFFICE.

HUBERT R. IVES, OF MONTREAL, CANADA.

IMPROVEMENT IN COMBINATION HOUSEHOLD-TOOLS.

Specification forming part of Letters Patent No. 134,064, dated December 17, 1872.

*To all whom it may concern:*

Be it known that I, HUBERT ROOT IVES, of the city of Montreal, in the district of Montreal, in the Province of Quebec, Canada, have invented new and useful Improvements on Combined Household-Tools; and I do hereby declare that the following is a full, clear, and exact description of the same.

This invention has reference to the combination of a pair of shears commonly called "snips" with a pair of crimping-jaws and a hammer-head in one and the same tool. This tool, although applicable to many uses, is particularly adapted for use in fitting stove-pipes together, the snips being used for cutting or trimming them, while the crimping-jaws may be used in reducing the diameter of the end of the pipe that passes within the end of the next continuing length whenever any difficulty is found in getting them together on account of their sizes being too closely alike, the hammer being for general use.

Reference is had to the drawing hereunto annexed, wherein similar letters of reference indicate like parts, and where—

Figure 2:

Figure 1 represents an elevation embodying my invention, and Fig. 2 represents a detail of crimping-jaws.

Letters $a\ a'$ are levers of ordinary configuration, attached together by a pivot, $b$, and with cutting-jaws $c\ c'$ extending on the other side of the pivot, as in the ordinary small hand-cutting shears or "snips" now in use, only that a central boss or hub, $d$, is formed, somewhat larger and of a different form to those commonly made; this is for the purpose of giving room for a pair of crimping-jaws, $e\ e'$. $f$ is a hammer-head, formed by a projection, extending, as shown in the drawing, from one of the halves of the boss $d$.

In constructing this tool the parts $a'$, $c'$, and $e'$ are all made in one and the same piece with one half of the boss $d$, while the parts $a$, $c$, $e$, and $f$ are all made in one and the same piece with the other half of the boss $d$, and are furthermore so arranged that when the ends of the lever $a\ a'$ are brought together, or nearly so, the cutters $c$ and $c'$, as also the jaws $e\ e'$, close at the same time, it only being necessary to carefully arrange the position of these for that purpose, so that one may not be left open when the others are shut, or one shut and the others left open. The jaws $e\ e'$, as clearly shown in Fig. 2, are corrugated to form a crimping-tool.

I am aware that various crimping-tools have been patented, notably those for which Letters Patent No. 127,001 were granted to Wm. Valk, May 21, 1872, in which it will be seen that the crimping performed by it is of equal depth from the edge of the pipe to the bottom of the crimp, while by the crimping-jaws above described the crimps will decrease as they extend backward from the edge until they die away in the smooth surface of the pipe. I do not claim these crimping-jaws *per se*, but, merely the combination of the various parts in one and the same tool, as follows:

The combined tool, consisting of shears $c\ c'$, jaws $e\ e'$, hammer $f$, all arranged together and working in combination with levers $a\ a'$, substantially as set forth.

Montreal, 19th day of September, A. D. 1872.

HUBERT R. IVES.

Signed in the presence of—
CHARLES G. C. SIMPSON,
FRAS. HY. REYNOLDS.